Aug. 6, 1935.   F. ROLLER   2,010,415
SPRING FOR VEHICLES
Filed July 10, 1931
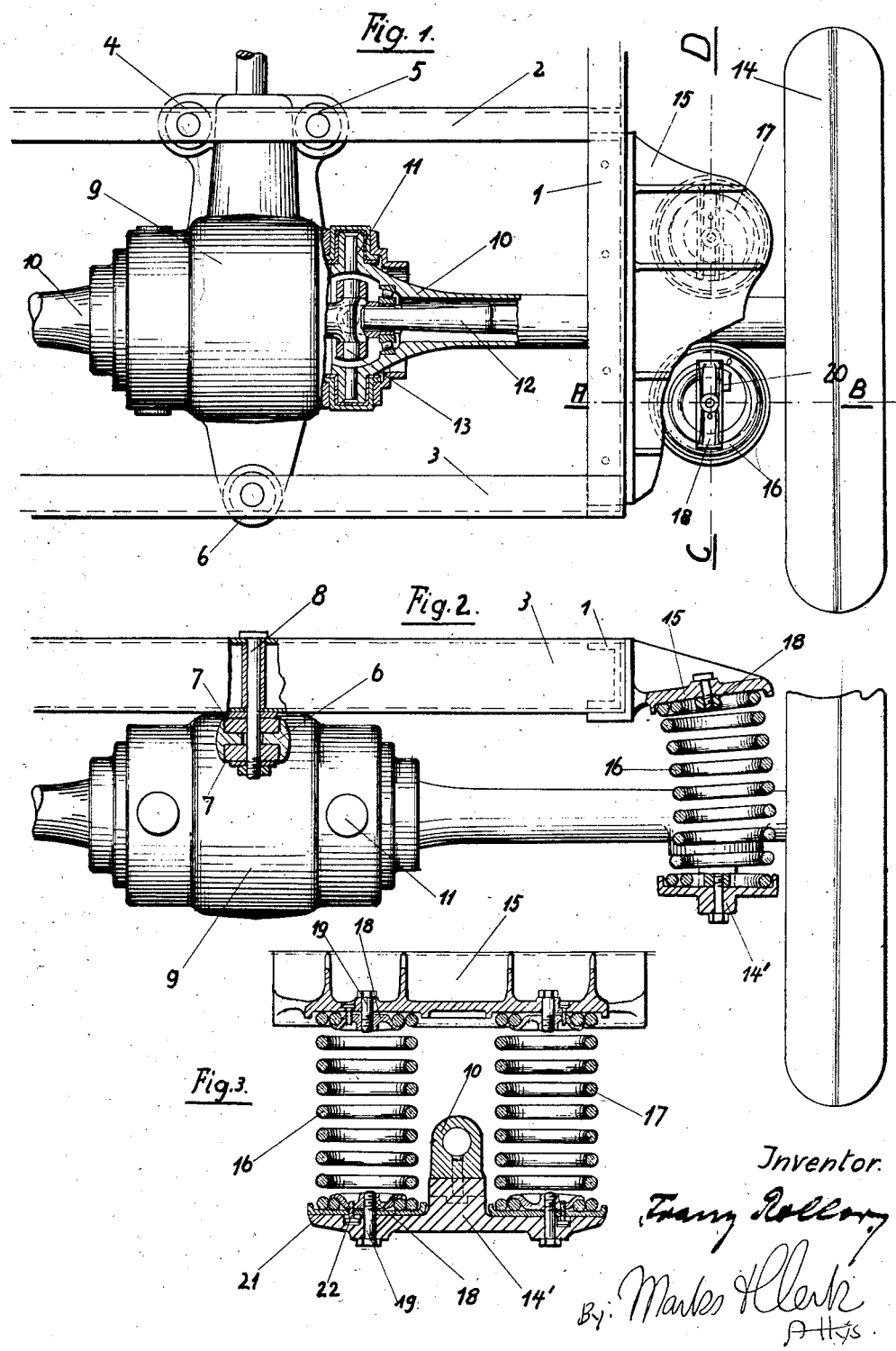

UNITED STATES PATENT OFFICE 2,010,415

SPRING FOR VEHICLES

Franz Roller, Stuttgart-Wangen, Germany, assignor to Daimler-Benz Aktiengesellschaft, Stuttgart-Unterturkheim, Germany, a company of Germany Application July 10, 1931, Serial No. 549,979
In Germany July 14, 1930

15 Claims. (Cl. 180—70)

This invention relates to springing arrangements for vehicles, more particularly power driven vehicles in which a separate half axle is used for each wheel, one end of which is jointed to the chassis of the vehicle, while the other end which carries the vehicle wheel can swing freely in a vertical plane.

The invention consists especially in this that for the springing freely swinging helical springs are used, so that friction in the springing is as far as possible avoided, and comfortable driving is made possible.

The invention further consists in this that all joints at the points where the springs are connected with the chassis and the axle are avoided so that the friction otherwise produced there is also avoided.

Furthermore, a very simple and cheap construction is obtained in this way and a construction which requires little, if any, attention or lubrication. The arrangement is therefore especially suitable for small and cheap vehicles.

In addition, arrangements are provided which prevent the ends of the springs being lifted or slipping from their supports in spite of the possibility of swinging freely.

Other advantages are made clear in the specification.

In the accompanying drawing:

Fig. 1 is a plan of the rear part of a chassis with a half axle jointed to it, shown partly in section, Fig. 2 is a rear elevation of the chassis shown in Fig. 1, a part of the elevation being shown in a section on the line A—B of Fig. 1, Fig. 3 is a section on the line C—D of Fig. 1.

1 is one of the longitudinal girders, and 2 and 3 are two transverse girders of the chassis. The differential housing 9, which is arranged in the middle axis of the vehicle, is secured directly to the transverse girders in such a manner that the girders are not subjected to twisting stresses, by means of three securing pistons 4, 5 and 6 in which are inserted the rubber blocks 7, for example under tension and by means of bolts 8. To this housing the axle housings or axle tubes 10 are connected laterally by means of pins 11 mounted in borings of the differential housing and separate bearing bushes in such a manner that the axles can only swing in a vertical direction about these pins. Inside the axle tubes are mounted the shafts 12, which are driven from the differential gear through Cardan joints 13 and which drive the wheels 14.

Below the axle tube 10 is secured a traverse 14′, while above this traverse an abutment 15 is secured to the longitudinal girder 1. Between this abutment and the traverse on both sides of the axle 2 helical springs 16 and 17 are interposed which are substantially without guides over their whole length, and the ends of which by means of closing pieces 18 and screws 19 are secured to the bearing surfaces of the abutment at one end and the traverse at the other end in such a manner that the last winding of the spring is turned inwards and embraced by the closing piece in the manner of a clamp, the end 20 being bent inward and in this way secured from turning outwards. This method of fixing has the advantage that it does not require any extra height, which, on account of the comparatively small space available, is of special importance. For the bearing surfaces for the springs separate plates 21 may be provided and the closing members prevented from turning by pins 22. The ends of the springs are somewhat inclined to one another according to the swinging radius of the axle, so that the ends of the springs may freely adapt themselves to the arc of swing. Joints in the springing are completely avoided. Friction is therefore reduced to a minimum so that shocks in a vertical direction may be immediately absorbed by the springs. For any shocks which reach the wheels in a horizontal direction the rubber blocks are provided at the securing place of the differential housing.

What I claim is:

1. In a vehicle, a chassis, a vehicle axle with one end so jointed to the chassis that the axle can swing freely in the vertical direction, a spring abutment on the chassis and a further spring abutment on the axle, the bearing surfaces of which are arranged in about the inclination of the swinging radii, a helical spring interposed between the spring abutments and substantially without guides over its whole length, a closing piece by which one end of the helical spring is secured to the first mentioned spring abutment, and a further closing piece by means of which the other end of the helical spring is secured to the second spring abutment.

2. In a vehicle, a chassis, a vehicle axle of which one end is jointed to the chassis and the other which carries the vehicle wheel can swing freely in a vertical direction, abutments which are rigidly connected with the chassis, a traverse which is rigidly connected with the axle and is curved under the axle on both sides of it, two helical springs bearing at one end against the abutments and at the other end against the traverse on both sides of the axle, closing pieces for securing the upper ends of the springs with the abutments, and closing pieces for securing the lower ends of the springs to the traverse.

3. In a vehicle, a chassis, a differential housing secured to the chassis in its middle axis, a driven vehicle axle, an axle housing surrounding this axle, borings in the differential housing and pins on the axle housing which are mounted in the borings and about it the axle housing can swing in a vertical plane, and helical springs which are substantially without guides over their whole length and have one end rigidly connected without a hinge to the chassis, and the other end rigidly connected without a hinge to the axle housing.

4. In a vehicle, a chassis, an axle carrier arranged in the middle axis of the vehicle, resilient connections between the chassis and the axle carrier, axles arranged laterally on the axle carrier, and carrying the vehicle wheels, pins connecting these axles with the axle carrier about which the axles can swing in a vertical plane, and helical springs by means of which the axles are sprung with respect to the chassis.

5. In a vehicle, a chassis, an axle carrier secured in the middle axis of the vehicle, rubber intermediate layers between the axle carrier and the chassis arranged laterally on the axle carrier, axles carrying the vehicle wheels, pins connecting these axles with the axle carrier about which the axles can swing in a vertical direction, and helical springs by means of which the axles are sprung with respect to the chassis.

6. In a vehicle, a chassis, a differential housing, resilient connections between the chassis and the housing arranged laterally on the housing, driven axles carrying the vehicle wheels, axle housings surrounding these axles, pins which connect the axle housings with the differential housing about which the axle housings can swing in a vertical direction, and helical springs by means of which the axles are sprung with respect to the chassis.

7. In a vehicle, a chassis, a differential housing arranged in the middle axis of the vehicle, three securing pistons by means of which the differential housing is secured to the chassis, rubber blocks between the securing pistons of the chassis arranged laterally on the differential housing, driven axles carrying the vehicle wheels, axle housings surrounding these axles, pins which connect the axle housings with the differential housing about which the axle housings can swing in a vertical direction, and helical springs by means of which the axles are sprung with respect to the chassis.

8. In a vehicle, a chassis, a pair of half axles having one end jointed to the chassis, the other ends of said half axles which carry the vehicle wheels being capable of swinging freely in a vertical plane independently of one another, helical springs bearing at one end against each half axle and bearing at the other end against the chassis, closing pieces for clamping the uppermost winding of each spring to the chassis, closing pieces for clamping the lowermost windings of the springs to the respective half axles and means for preventing the springs from turning.

9. In a vehicle, a chassis, a pair of half axles having one end jointed to the chassis, the other ends of said half axles which carry the vehicle wheels being capable of swinging freely in a vertical plane independently of one another, helical springs having the end windings thereof of smaller diameter than the other windings bearing at one end against each half axle and bearing at the other end against the chassis, closing pieces for clamping the uppermost winding of each spring to the chassis, and closing pieces for clamping the lowermost windings of the springs to the respective half axles.

10. In a vehicle, a chassis, a pair of half axles having one end jointed to the chassis, the other ends of said half axles which carry the vehicle wheels being capable of swinging freely in a vertical plane independently of one another, helical springs bearing at one end against each half axle and bearing at the other end against the chassis, closing pieces for clamping the uppermost winding of each spring to the chassis, and closing pieces for clamping the lowermost windings of the springs to the respective half axles, the ends of said springs having an inwardly bent portion for preventing the springs from turning.

11. In a power driven vehicle, a chassis frame, a pair of half axles each having a wheel thereon and articulated to the chassis frame with the wheels located opposite one another and so that the half axles together with the wheels can swing in a vertical transverse plane of the vehicle projecting bearing blocks secured, one on each side, to the frame and helical suspension springs fixed at one end to the half axles and at the other end to the bearing blocks.

12. In a power driven vehicle, a chassis frame, a pair of half axles each having a wheel thereon and articulated to the chassis frame with the wheels located opposite one another and so that the half axles together with the wheels can swing in a vertical transverse plane of the vehicle, projecting bearing blocks secured, one on each side, to the frame above the half axles and helical suspension springs fixed at their lower ends to the half axles and at their upper ends to the bearing blocks, said springs being substantially unguided over their entire length.

13. In a power driven vehicle, a chassis frame, an axle support secured to the frame, a pair of half axles each having a wheel thereon and articulated to the axle support, one on each side thereof with the wheels located opposite one another and so that the half axles together with the wheels can swing in a vertical transverse plane of the vehicle, projecting bearing blocks, secured, one on each side, to the frame and helical suspension springs fixed at one end to the half axles and at the other end to the bearing blocks.

14. In a power driven vehicle, a chassis frame comprising longitudinal and transverse frame members, a pair of half axles each having a wheel thereon and articulated to the chassis frame with the wheels located opposite one another and so that the half axles together with the wheels can swing in a vertical transverse plane of the vehicle, bearing blocks secured to the longitudinal frame members on the outside thereof opposite the wheels and helical suspension springs fixed at one end to the half axles and at the other end to the bearing blocks.

15. In a power driven vehicle, the combination as set forth in claim 13 in which the half axles are articulated to the axle support by means of a hinge pin connection which only permits the axle to swing in a vertical transverse plane and with the axle support forms a rigid system in the horizontal direction.

FRANZ ROLLER.